(No Model.)
F. McKINLEY.
CULINARY BOILER.
No. 461,120. Patented Oct. 13, 1891.
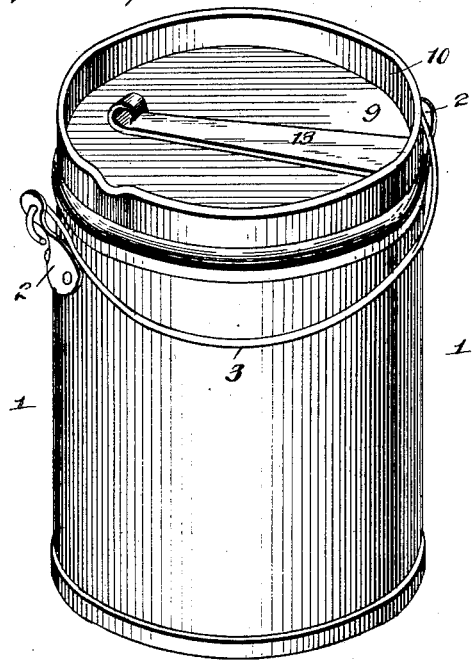
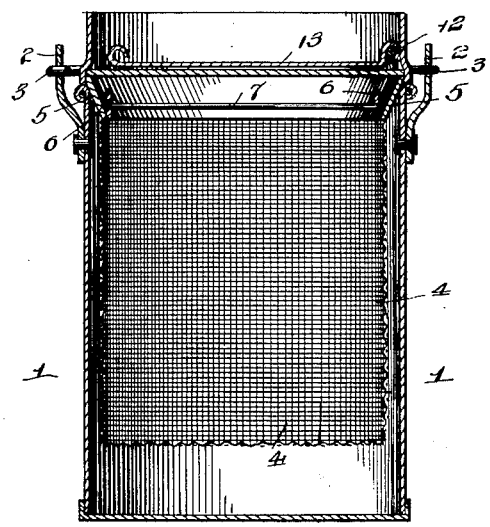
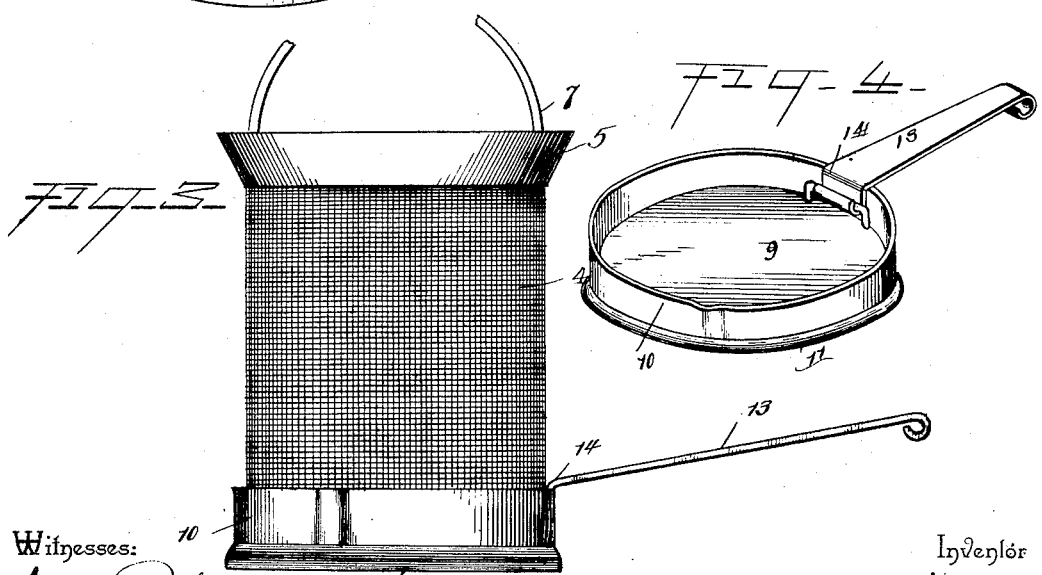
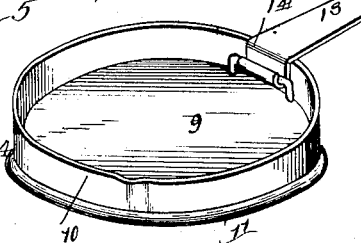
Witnesses:
Isaac Belmund.
W. S. Duvall.
Inventor
Fred. McKinley
By his Attorneys,
C. A. Snow & Co.

United States Patent Office.

FRED McKINLEY, OF ACME, WASHINGTON.

CULINARY BOILER.

SPECIFICATION forming part of Letters Patent No. 461,120, dated October 13, 1891.

Application filed March 19, 1891. Serial No. 385,659. (No model.)

*To all whom it may concern:*

Be it known that I, FRED MCKINLEY, a citizen of the United States, residing at Acme, in the county of Whatcom and State of Washington, have invented a new and useful Culinary Boiler, of which the following is a specification.

My invention relates to domestic boilers or cookers for cooking beans, rice, soups, potatoes, &c.; and the objects in view are to provide a cooker of the above class adapted to support the vegetables being cooked in a separated manner from the water, so that said vegetables may be lifted as a whole and the water drained therefrom, and, furthermore, to provide a convenient cover for the cooker in which the vegetables may be drained of water.

Referring to the drawings, Figure 1 is a perspective of a cooker constructed in accordance with my invention. Fig. 2 is a vertical section of the same. Fig. 3 is a detail in elevation of the combined top and drip-pan and the perforated cylinder mounted therein. Fig. 4 is a detail view of the combined cover and drip-pan.

Like numerals of reference indicate like parts in all the figures of the drawings.

1 designates a boiler of any suitable shape, size, &c., and the same is provided with ears 2 and bail 3.

4 designates a vegetable-cylinder, the wall and bottom of which are perforated minutely and the former surrounded by an inclined flange 5, formed of imperforate metal, and to the same upon its inner side is secured a pair of bail-ears 6, in which are loosely connected the ends of a bail 7.

8 designates the combined cover and drip-pan, the same consisting of a bottom 9 and a surrounding wall 10. The wall 10 extends some distance above the bottom and is flared at its lower edge, as at 11, and extended some distance below the bottom. A loop 12 is soldered or otherwise secured to the bottom, and to the same is loosely connected a handle 13, adapted to fold down upon the bottom or extend over the edge of the wall of the cover, for which purpose the handle is bent at a right angle, as at 14.

In operation the boiler 1 is filled with water, after which the vegetables to be cooked—for instance, beans—are placed in the cylinder and the latter inserted in the boiler, and is supported above the bottom of the same by the inclined flange 5, the upper edge of which extends above the edge of the boiler. By the flange 5 the vegetables are supported above the bottom of the boiler, and the only point of contact between the boiler and cylinder is at the upper edge of the former. The cover is now placed upon the cylinder, the lower flange 11 thereof fitting thereover, and the handle is folded within the pan or cover. When the beans have cooked sufficiently, the handle is swung from its folded position, and by means of the same the combined pan and cover lifted from the cylinder, and with the other hand the cook lifts the cylinder from the boiler, and after placing the pan under the cylinder sets the same upon a table or other convenient place. The water is now poured from the boiler, and while this is being accomplished the water is being drained from the beans, after which the cylinder may be replaced in the boiler to dry. In cooking potatoes a similar operation takes place, and in soups the coarse vegetables may be supported within the cylinder, and after the soup has been made the vegetables may be withdrawn by simply lifting the cylinder from the boiler, thus leaving the soup in the latter. The cylinder, being placed in the pan, serves to drain all soup into the latter, which may be poured back into the boiler.

Having described my invention, what I claim is—

1. The herein-described cooker, consisting of a boiler, a perforated cylinder supported within the boiler, and a combined cover and pan mounted on the cylinder and having upper and lower annular flanges, the upper flange being deeper than the lower flange and adapted to serve as a pan, substantially as specified.

2. The herein-described cooker, consisting of a boiler, an inner perforated cylinder, and the cover and pan combined, the same being provided with a handle hinged to one side and to the bottom of the cover and foldable within the same, substantially as specified.

3. The herein-described cooker, consisting of the boiler, the inner cylinder having the perforated wall and bottom, the upper flared imperforate flange fitting the upper end of the boiler, the bail connected to the flange, and the combined cover and pan, consisting of the bottom, the upper surrounding flange and the lower flared flange fitting the cylinder, the loop, and the bent handle connected with the loop, adapted to fold down upon the bottom or outwardly over the edge of the flange, substantially as specified.

In testimony that I claim the foregoing as my own I have hereto affixed my signature in presence of two witnesses.

FRED McKINLEY.

Witnesses:
D. E. BIGGS,
F. N. BRONSON.